United States Patent Office 2,746,868
Patented May 22, 1956

2,746,868

FLUID SHORTENING COMPOSITION

Sherwood T. Cross, Elsmere, Del., and William C. Griffin, West Chester, Pa., assignors to Atlas Powder Company, Wilmington, Del., a corporation of Delaware No Drawing. Application November 12, 1952,
Serial No. 320,104

4 Claims. (Cl. 99—123)

This invention relates to vegetable oil compositions and more particularly to edible vegetable oil compositions for use in baking.

In the baking art, and particularly in the art of baking cakes, the use of liquid vegetable oils for shortening has been found generally unsatisfactory. Only in specialty formulations, such for example, as in the so-called "chiffon cakes" has it been considered possible to employ any but the solid or semi-solid shortenings. It has, heretofore, been considered impossible to make a good cake, raised by chemical leavening agents, when the shortening is a liquid oil. Accordingly, it has been the practice to harden the oils, as by hydrogenation for use in shortening. Hydrogenation adds to the cost of the shortening and converts it to a pasty-to-waxy solid which is much more inconvenient to manipulate in combining it with other ingredients than would be a liquid shortening.

It is, therefore, an object of this invention to provide fluid shortening compositions from vegetable oils.

A further object is to provide fluid compositions of vegetable oils and baking improvers of superior shortening value.

The above and other objects will become more apparent in the course of the following description of the invention and in the appended claims.

It is well known to add "improvers" to the usual semisolid to solid shortening compounds for the purpose of improving the texture and volume of cakes made therewith. Most widely used for this purpose are the partial esters of glycerol and other polyhydric alcohols, particularly glycerol monostearate. These same improvers, however, are not effective when employed with liquid vegetable oils, to produce shortening compounds from which satisfactory chemically raised cakes can be baked.

In accordance with the present invention fluid compositions comprising liquid vegetable oils and baking improvers selected from a group to be fully described hereinafter are provided, which can be used as the sole source of shortening in chemically raised cakes to produce cakes of excellent volume, texture and eating properties.

The oil component of the fluid shortening compositions of the invention may be any edible oil of vegetable origin. Corn oil, cottonseed oil, soya oil, and peanut oil may be particularly mentioned although the invention is not limited to these oils. Blends of oils, likewise, may be employed.

The baking improver in the shortening compositions of the invention is a polyoxyethylene ether of a partial ester of a hexitan or a mixture of such an ether with a partial ester of a hexitan. The said partial ester is the ester of a solid fatty acid, such for example as a stearate, a palmitate or a myristate; and the said polyoxyethylene ethers are those containing from 2 to 20 oxyethylene groups per mol. The baking improvers of the inventions, moreover, contain at least 3% by weight of combined oxyethylene radical and from 55% to 70% by weight of acyl radical.

Baking improvers for vegetable oil shortenings coming within the scope of the invention may be single polyoxyethylene ethers of partial esters, mixtures of such polyoxyethylene ethers or mixtures of such ethers with partial esters. Representative improvers are listed below. In the listing a number hyphenated to OE is used as an abbreviation for the polyoxyethylene ether containing the indicated number of oxyethylene groups. Thus the first member of the list is an abbreviation for the polyoxyethylene ether of sorbitan distearate containing 5 oxyethylene groups per mol.

5–OE sorbitan distearate
2–OE sorbitan dimyristate
10–OE mannitan tristearate
50% 20–OE sorbitan tristearate—50% sorbitan tristearate
10% 20–OE sorbitan monostearate—90% sorbitan monostearate
25% 15–OE mannitan dipalmitate—75% mannitan monopalmitate
50% 10–OE mannitan dimyristate—50% sorbitan dimyristate
70% 20–OE sorbitan tristearate—30% sorbitan monostearate
80% 5–OE mannitan distearate—20% 10–OE sorbitan tristearate The proportion of baking improver added to the oil in the shortening compositions of the invention varies somewhat with the oil and with the particular improver but, in general, small proportions are most satisfactory. A preferred range is from about 2% to about 7% based on the weight of oil.

The baking improvers of the invention are not always completely soluble in the vegetable oils but may be effectively employed when suspended therein. They may be satisfactorily incorporated by passing the oil and improver through a colloid mill or by subjecting the mixture to other agitation of high shearing force, as in a turbine type mixer or Dispersator. Suspensions so prepared usually do not remain uniformly dispersed on storage but any separation is in the nature of a creaming and simple agitation suffices to redisperse the improver uniformly through the oil. The shortening compositions contemplated by the invention include such semistable, mechanically produced suspensions. Also within the purview of the invention are compositions in which minor proportions of mutual solvents, coupling agents or suspension stabilizers are added to prevent or minimize phase separation. Thus, replacement of up to 10% of the liquid shortening by propylene glycol, polypropylene glycol, or by a lower fatty acid ester of such glycol, is effective in certain cases to improve the stability of the suspensions.

The preparation of specific improved oil shortenings in accordance with the invention is shown in the following examples.

*Example I*

To 100 parts by weight of an edible cottonseed oil (salad oil) at 65° C., add 4.75 parts of sorbitan monostearate and 0.55 part of 20–OE sorbitan monostearate. Treat the mixture in a high shearing force mixer, as by passage through a Premier Colloid Mill, while cooling to room temperature. The resulting suspension is semi-stable in that a cream of the baking improver tends to rise in the mixture on standing, said cream being easily redispersible by simple agitation as, for example, by repeated inversion of the container in which the suspension is stored, or by hand stirring with a paddle.

Example II

To 100 parts by weight of an edible grade of corn oil at 60° C. add 3 parts of sorbitan tristearate and 2 parts of 20–OE tristearate. Subject the mixture to high speed agitation with a turbine type mixer while cooling to room temperature. An improved liquid shortening composition for cake baking is thus obtained. The suspension, like that of Example I, is semi-stable.

Example III

To 100 parts by weight of peanut oil at 60° C. add 2 parts each or sorbitan tristearate and 20–OE sorbitan monostearate and proceed as in Examples I or II.

The examples could be multiplied indefinitely by describing the incorporation of each of the baking improvers specifically named hereinbefore into edible oils of vegetable origin, in varying amounts from 2% to 10%. Such exemplification would be repetitive and the above examples are sufficient to illustrate the compositions of the invention and methods for their preparation.

Illustrating the utilization of compositions of the invention in the bakery art are the following examples which describe the preparation of two types of cakes.

Example IV 57.5 grams of the product of Example I, hand shaken to insure uniformity of suspension, is introduced into the bowl of a household mixer. To the improved liquid shortening are added the following dry ingredients and the mixer run until the oil is thoroughly incorporated therewith:

| | Grams |
|---|---|
| Cake flour | 187.5 |
| Granulated sugar | 217.0 |
| Salt | 3.4 |
| Baking powder | 11.1 |
| Egg albumin | 7.3 |
| Milk powder | 27.4 |

120 ml. of water is then added and the mixture agitated for two minutes. 160 ml. more of water is added and the mixture agitated for one minute. The batter, so formed, is poured into two 8 inch cake pans and baked in an oven at 375° F. for 29 minutes.

The product is a white cake of good volume and excellent texture.

Example V

A yellow cake of excellent texture, volume and keeping qualities may be made in accordance with the following recipe:

2¼ cups sifted cake flour
3 tsp. baking powder
1 tsp. salt
1½ cups sugar
½ cup of the product of Example II hand shaken to insure uniformity
1 cup milk
1 tsp. vanilla
2 eggs unbeaten The flour, baking powder, salt and sugar are sifted together into a mixing bowl and thoroughly mixed with the liquid shortening. Three fourths of the milk and the vanilla are added, mixing until the flour is dampened. The batter is then beaten for 2 minutes at low speed with a kitchen mixer. The eggs and remaining milk are added and the batter is beaten for 1 minute at low speed.

The cake is baked in two 9-inch pans for 35 minutes at 375° F.

The above examples suffice to illustrate how the shortening compositions of the invention may be used. In general, the fluid shortening compositions of the invention may be employed measure for measure in place of the more costly and more difficultly manipulable solid and plastic shortenings previously considered necessary in the production of chemically raised cakes.

What is claimed is:

1. A fluid shortening composition comprising an edible vegetable oil containing in suspension from 2% to 10% by weight of a baking improver selected from the group consisting of polyoxyethylene ethers of solid fatty acid partial esters of hexitans and mixtures of said polyoxyethylene ethers with solid fatty acid partial esters of hexitans; said ethers containing from 2 to 20 oxyethylene groups per mol, and said baking improver containing from 55% to 70% by weight of combined acyl radical and at least 3% by weight of combined oxyethylene radical.

2. A fluid shortening composition comprising an edible vegetable oil containing in suspension from 2% to 7% by weight of a mixture of a solid fatty acid partial ester of a hexitan and a polyoxyethylene ether, containing from 2 to 20 oxyethylene groups per mol, of a solid fatty acid partial ester of a hexitan; said mixture containing from 55% to 70% by weight of combined acyl radical and at least 3% by weight of combined oxyethylene radical.

3. A composition as in claim 2 wherein the said partial ester is sorbitan monostearate and the said ether is the polyoxyethylene ether of sorbitan monostearate containing 20 oxyethylene groups per mol.

4. A composition as in claim 2 wherein the said partial ester is sorbitan tristearate and the said ether is the polyoxyethylene ether of sorbitan tristearate containing 20 oxyethylene groups per mol.

References Cited in the file of this patent

UNITED STATES PATENTS

| 2,422,486 | Johnston | June 17, 1947 |
| 2,532,523 | Trempel et al. | Dec. 5, 1950 |

OTHER REFERENCES

"Atlas Spans and Tweens," Atlas Powder Company, Industrial Chemicals Department, Wilmington, Delaware, reprinted June 1945, pages 1–12.